United States Patent
Ilic et al.

(10) Patent No.: US 6,473,284 B1
(45) Date of Patent: Oct. 29, 2002

(54) LOW-POWER DC-TO-DC CONVERTER HAVING HIGH OVERVOLTAGE PROTECTION

(75) Inventors: Milan Zarko Ilic, Clifton Park, NY (US); Warren Ralph Germer, Hampton, NH (US); Richard Alan Balch, North Hampton, NH (US)

(73) Assignee: General Electric Company, Niskayuna, NY (US)

( * ) Notice: Subject to any disclaimer, the term of this patent is extended or adjusted under 35 U.S.C. 154(b) by 158 days.

(21) Appl. No.: 09/657,633

(22) Filed: Sep. 6, 2000

(51) Int. Cl.[7] .................................................. H02H 3/20
(52) U.S. Cl. ......................... 361/91.1; 361/91.6; 361/18
(58) Field of Search .......................... 361/90, 91.1–91.7, 361/56, 18, 111

(56) References Cited

U.S. PATENT DOCUMENTS

| | | | | |
|---|---|---|---|---|
| 5,177,429 A | * | 1/1993 | Eki | 323/281 |
| 5,668,705 A | | 9/1997 | Balch et al. | 363/21 |
| 5,729,418 A | * | 3/1998 | Lei | 361/58 |
| 5,773,965 A | * | 6/1998 | Hayashi | 323/222 |
| 5,828,204 A | * | 10/1998 | Jansen | 323/266 |
| 6,184,664 B1 | * | 2/2001 | Ponzetta | 323/274 |
| 6,242,968 B1 | * | 6/2001 | Sakai et al. | 327/427 |

OTHER PUBLICATIONS

"Self–Generated Overvoltages Due to Open–Phasing of Ungrounded–Wye Delta Transformer Banks," RA Walling; RK Hartana; WJ Ros, IEEE, 1995, pp. 526–533. Jan. 1995.

* cited by examiner

Primary Examiner—Bao Q. Vu
(74) Attorney, Agent, or Firm—Jill M. Breedlove; Christian G. Cabou

(57) ABSTRACT

A dc-to-dc converter is provided with overvoltage protection circuitry while still providing normal output voltage. Such overvoltage protection circuitry does not require resetting. The overvoltage protection circuitry includes a first switching device connected between the input bridge and a dc output voltage bus and further includes an overvoltage current path. The overvoltage current path includes a complementary switching device in series with Zener diode circuitry having a predetermined breakdown voltage, and further has a transition current path. The first switching device is closed for nominal input voltage and is open for overvoltages. When the input voltage exceeds the Zener diode breakdown voltage, the transition current path conducts current. When the threshold voltage of the complementary switching device is exceeded, the complementary switching device turns on and conducts current through the overvoltage current path. After the overvoltage transient condition subsides and the input voltage decreases back to the nominal range, the complementary switching device turns off, and normal converter operation resumes.

8 Claims, 2 Drawing Sheets

LOW-POWER DC-TO-DC CONVERTER HAVING HIGH OVERVOLTAGE PROTECTION

BACKGROUND OF THE INVENTION

The present invention relates generally to power converters and, more particularly, to a dc-to-dc converter having overvoltage protection.

To be practicable, off-line switching converters supplied from an ac line need low-cost switching devices with very high breakdown voltage. The availability of such components is limited. Considering, for example, a 480 Vac line voltage with a +20% upper voltage limit, a maximum dc bus voltage value can be as high as 800 Vdc. Assuming a single-switch dc-to-dc converter topology as a most economical solution, such a switching device would need a breakdown voltage of over 1000V.

Presently, low-cost transistors (e.g., insulated gate bipolar transistors (IGBT's) and MOSFET's) are available with a breakdown voltage rating of up to 1,600V. Disadvantageously, such switching devices can easily fail if the dc bus voltage exceeds 1,000V during an input voltage transient. For overvoltage pulses of short duration, the dc bus voltage can be limited by metal-oxide varistors that offer effective and economical protection against lightning surges and other fast transients. Such metal-oxide varistors, however, do not have sufficiently high energy ratings to effectively guard against certain longer-lasting input voltage transients.

In North America, an ungrounded wye-delta transformer connection is commonly used to supply 480 Vac to light industrial loads. When a primary phase is disconnected from the source, the transformer can generate severe overvoltages that may persist for as long as the open-phase condition is present. Two distinctly different phenomena can cause such an overvoltage condition: (1) a shift of the neutral voltage due to load imbalance; or (2) ferroresonance due to interaction between the transformer core saturation characteristics and the transformer winding capacitance. It has been documented that an overrvoltage magnitude can be 2.5 times higher than a nominal voltage and can last as long as 30 seconds. In such an environment, a metal-oxide varistor could not be used as a protection device.

Other available methods of overvoltage protection, including (1) various combinations of circuit breakers and surge arresters and (2) protective devices in combination with Zener diodes, disadvantageously require resetting.

Accordingly, it is desirable to provide protection for a dc-to-dc converter from overvoltages while providing normal output voltage. It is furthermore desirable that such protection not require resetting after occurrence of an overvoltage.

BRIEF SUMMARY OF THE INVENTION

A dc-to-dc converter is provided with overvoltage protection circuitry while still providing normal output voltage. Such overvoltage protection circuitry advantageously does not require resetting. In exemplary embodiments, the overvoltage protection circuitry is connected between an input rectifier bridge and a dc output voltage bus, and comprises a first switching device connected between the input bridge and the dc output voltage bus and further comprises an overvoltage current path. The overvoltage current path comprises a complementary switching device in series with Zener diode circuitry having a predetermined breakdown voltage. The overvoltage current path further comprises a transition current path. The first switching device is closed for nominal input voltage and is open for overvoltages. When the input voltage exceeds the Zener diode breakdown voltage, the transition current path conducts current. Then, when the threshold voltage of the complementary switching device is exceeded, the complementary switching device turns on and current flows through the overvoltage protection path formed by complementary switching device 30 and the Zener diode circuitry. After the overvoltage transient condition subsides and the input voltage decreases back to the nominal level, the complementary switching device turns off, and normal converter operation resumes.

DETAILED DESCRIPTION OF THE INVENTION

Figure 1:
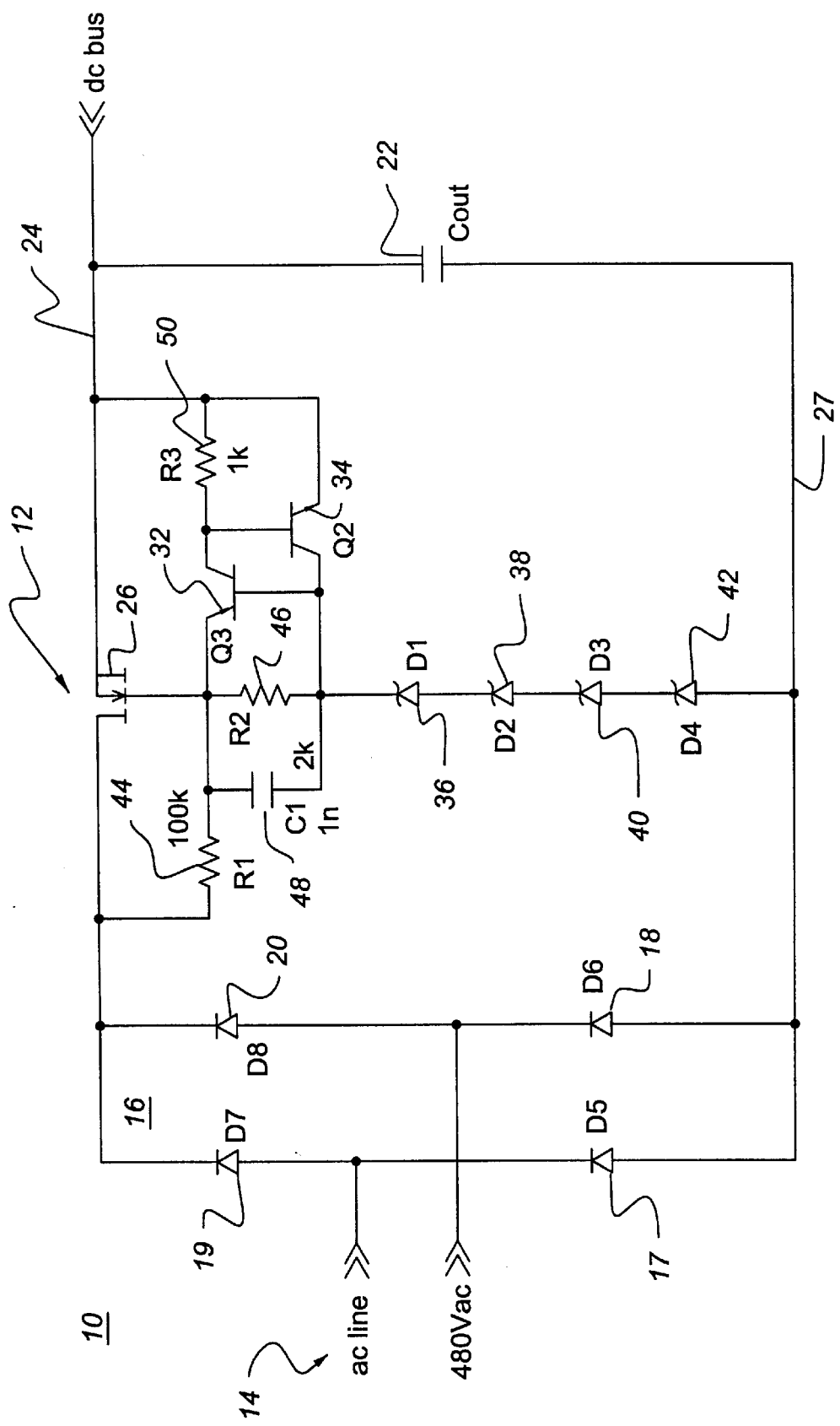
FIG. 1 schematically illustrates a power converter with overvoltage protection circuitry in accordance with exemplary embodiments of the present invention.

FIG. 1 illustrates an ac-to-dc converter 10 with overvoltage protection circuitry 12 in accordance with exemplary embodiments of the present invention. As shown, converter 10 is supplied by ac line voltage 14, illustrated as 480 Vac. An input rectifier bridge 16 comprising diodes 17–20 receives the input ac line voltage. The rectified input voltage is transferred to an output capacitor 22 coupled to a dc bus 24 for supplying a dc-to-dc converter 25.

In the exemplary embodiment of FIG. 1, overvoltage protection circuitry 12 comprises a first switching device 26 coupled between the input rectifier bridge 16 and the output voltage bus 24. By way of example, switching device 26 is illustrated as a MOSFET. Other suitable switching devices may be used, such as an IGBT, for example. The overvoltage protection circuitry further comprises a complementary switching device 30 connected in series with Zener diode circuitry, represented as a plurality of (e.g., four) series-connected Zener diodes 36, 38, 40, and 42 connected between the gate of first switching device 26 and a reference potential 27.

Complementary switching device 30 is illustrated in FIG. 1 as comprising two bipolar switching devices 32 and 34 with device 32 shown as comprising a pnp-type transistor and device 34 shown as an npn-type transistor, the base of each transistor 32 and 34, respectively, being coupled to the collector of the other transistor 34 and 32, respectively. Overvoltage protection circuitry 12 further comprises a transition current path, illustrated in FIG. 1 as comprising a resistor 44 (R1) in series with a resistor 46 (R2), the series connection of resistors 44 and 46 being connected in series with the Zener diodes. A capacitor 48 (C1) is connected across resistor 46 (R2); and another resistor 50 (R3) is connected between the complementary switching device 30 and the output voltage bus 24.

In operation, for nominal input voltage, the first switching device 26 is closed and conducting. Rectified input voltage is transferred to the output capacitor 22, and hence the output voltage bus 24, during normal operation. When the input voltage exceeds the Zener diode breakdown voltage, current flows through the current transition path, i.e., through resistors 44 (R1) and 46 (R2) and the Zener diodes. As soon as the voltage drop across resistor R2 reaches the threshold voltage for bipolar transistors 32 and 34, complementary switch closes 30 and conducts, thereby turning off the first switching device, such that current flows substantially entirely through the overvoltage protection path formed by the complementary switching device 30 and the Zener diodes.

After the overvoltage transient condition subsides and the input voltage drops back to nominal range, the complementary switch 30 stops conducting. With the complementary switching device off, normal circuit operation resumes with rectified input voltage being provided to the output capacitor Cout through the first switching device 26.

The minimum breakdown (or breakover) voltage of the Zener diodes is preferably selected to be higher than the maximum magnitude of the input voltage during normal operation. For example, for a 480 Vac line voltage with a maximum magnitude of 480V+15%, and for an 800V breakdown voltage, four standard 200V Zener diodes can be used.

The minimum transition current of the complementary switch can be adjusted by adjusting the value of resistance 46 (R2). The transition current is the maximum current through the transition current path (i.e., resistors R1 and R2 and the Zener diodes) before complementary switching device 30 turns on. The capacitor C1 in parallel with resistor R2 functions to avoid closing of the complementary switch due to high frequency noise.

Using either a MOSFET or an IGBT as the first switching device 26 advantageously provides efficient protection with negligible conduction losses. However, other suitable switching devices may also be used to implement the first switching device.

Figure 2:
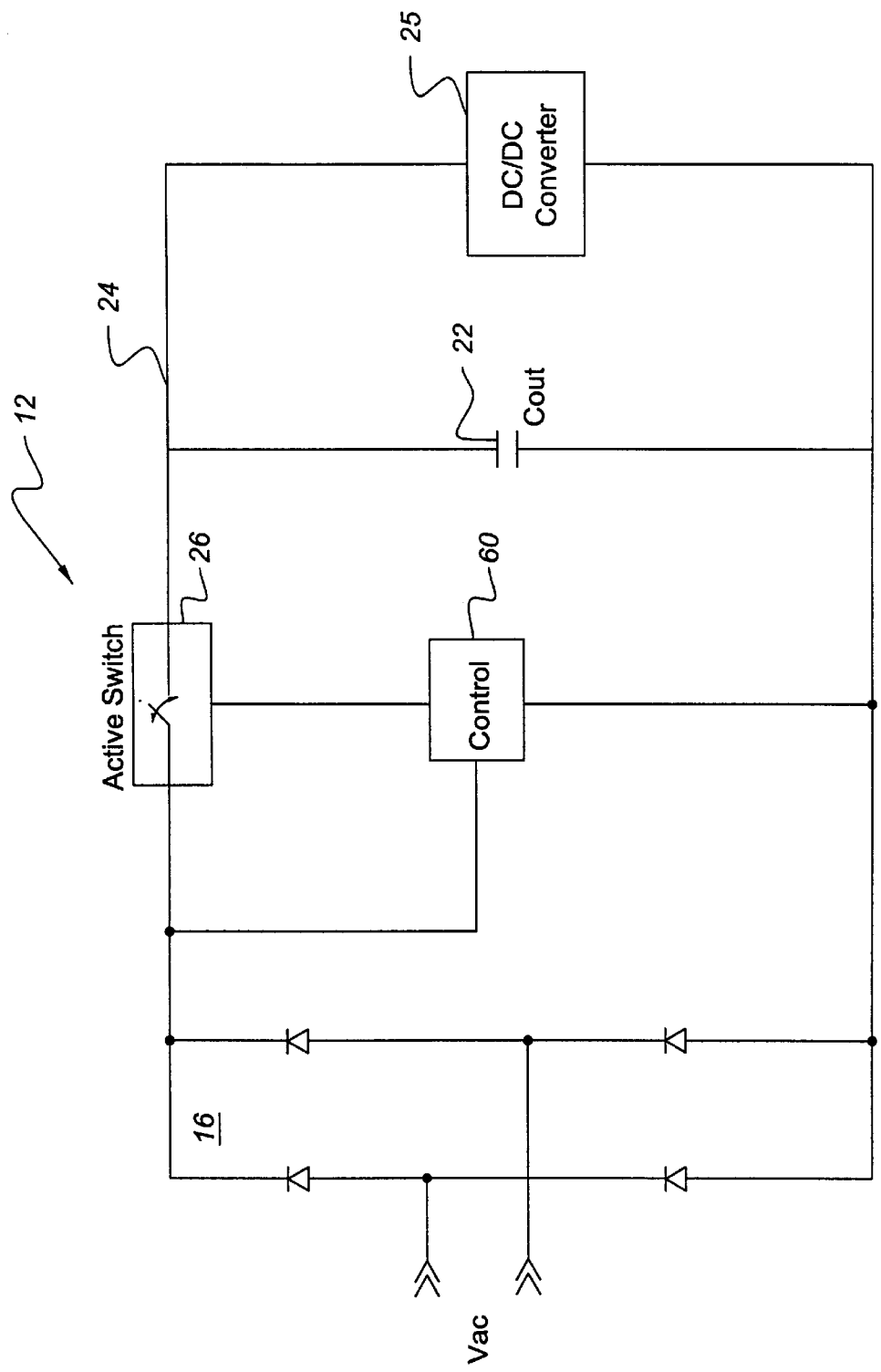
FIG. 2 schematically illustrates a general implementation of alternative embodiments of the circuitry of FIG. 1.

FIG. 2 schematically illustrates a general implementation of alternative embodiments of the circuitry of FIG. 1. In FIG. 2, the overvoltage protection circuitry 12 is generally represented as comprising an active switch 26 and a control 60 coupled between the input bridge 16 and the output dc bus 24. In general, if the input ac line voltage is greater than a threshold, then the active switch is controlled by control 60 to be off; and if the input voltage is less than or equal to the threshold, then the active switch is controlled to be on, such as described in detail with reference to FIG. 1.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power converter having an input rectifier circuit and an output dc voltage bus, comprising:
    a first switching device coupled between the input rectifier circuit and the output dc voltage bus; and
    an overvoltage current path comprising a complementary switching device coupled in series with Zener diode circuitry having a predetermined breakdown voltage, the overvoltage current path further comprising a transition current path, the first switching device being on for operation in a nominal input voltage range such that rectified input voltage is provided to the output dc voltage bus, the transition current path being activated when the input voltage exceeds the Zener diode breakdown voltage, the complementary switching device being turned on when the threshold voltage thereof is exceeded, the first switching device becoming non-conductive upon activating the complementary switching device such that current flows substantially entirely through the overvoltage current path, the complementary switching device becoming non-conductive upon the input voltage decreasing back to the nominal input voltage range.

2. The converter of claim 1 wherein the transition current path comprises at least one resistor in series with the Zener diode circuitry.

3. The converter of claim 2 wherein the value of transition current through the transition current path is adjusted by adjusting the resistance of the resistor.

4. An overvoltage protection circuit for a dc-to-dc power converter of a type being supplied from a dc voltage bus coupled to an input rectifier circuit for receiving an input ac voltage, comprising:
    an active switch coupled between the input rectifier circuit and the dc voltage bus; and
    a control circuit coupled to the active switch, the control circuit comprising an overvoltage current path, the control circuit controlling operation of the active switch such that the active switch is on for operation in a nominal input voltage range with the input voltage being rectified and supplied to the dc voltage bus, and further such that the active switch is off when a threshold voltage above the nominal input voltage range is exceeded to provide current flow substantially through the overvoltage current path, the active switch being turned off by the control circuit when the input voltage decreases back to the nominal input voltage range.

5. The overvoltage protection circuit of claim 1 wherein the active switch comprises a first switching device and wherein the overvoltage current path comprises a complementary switching device coupled in series with breakdown voltage circuitry having a predetermined breakdown voltage, the overvoltage current path further comprising a transition current path, the first switching device being on for operation in the nominal input voltage range, the transition current path being activated when the input voltage exceeds the breakdown voltage, the complementary switching device being turned on when the threshold voltage thereof is exceeded, the first switching device becoming non-conductive upon activating the complementary switching device such that current flows substantially entirely through the overvoltage current path, the complementary switching device becoming non-conductive upon the input voltage decreasing back to the nominal input voltage range.

6. The overvoltage protection circuit of claim 5 wherein the breakdown voltage circuitry comprises at least one Zener diode.

7. The overvoltage protection circuit of claim 6 wherein the transition current path comprises at least one resistor in series with the at least one Zener diode.

8. The overvoltage protection circuit of claim 7 wherein the value of transition current through the transition current path is adjusted by adjusting the resistance of the at least one resistor.

* * * * *